United States Patent [19]

Verellen et al.

[11] Patent Number: 4,784,407
[45] Date of Patent: Nov. 15, 1988

[54] PASSIVE SAFETY BELT SYSTEM

[75] Inventors: Lawrence J. Verellen, Washington; Theodore A. Baker, Almont, both of Mich.

[73] Assignee: TRW Vehicle Safety Systems Inc., Lyndhurst, Ohio

[21] Appl. No.: 89,137

[22] Filed: Aug. 25, 1987

[51] Int. Cl.$^4$ .................................................. B60R 21/10
[52] U.S. Cl. ..................................... 280/804; 280/808
[58] Field of Search ....................... 280/804, 808, 801

[56] References Cited

U.S. PATENT DOCUMENTS

| | | | |
|---|---|---|---|
| 4,061,365 | 12/1977 | Nagano et al. | 280/804 |
| 4,313,622 | 2/1982 | Suzuki et al. | 280/804 |
| 4,475,745 | 10/1984 | Fohl | 280/804 |
| 4,533,158 | 8/1985 | Ueda | 280/804 |
| 4,564,218 | 1/1986 | Yokote et al. | 280/804 |

FOREIGN PATENT DOCUMENTS 1407984 10/1975 United Kingdom ............... 280/804

Primary Examiner—Kenneth R. Rice
Attorney, Agent, or Firm—Tarolli, Sundheim & Covell

[57] ABSTRACT

A safety belt system has an elongated flexible drive element or tape which pulls a carrier connected with the safety belt along a track. Opposite ends of the tape are connected to a dual channel spool having inner and outer spool portions. A single reversible electric motor is operable to rotate the dual channel spool in one direction to pull the safety belt away from the occupant of a vehicle and in the opposite direction to pull the safety belt toward the occupant of the vehicle. As the spool is rotated in one direction, the tape is wound around one of the spool portions to pull the carrier rearwardly along the track. When the spool is rotated in the opposite direction, the tape is wound around the other spool portion to pull the carrier forwardly along the track.

18 Claims, 4 Drawing Sheets

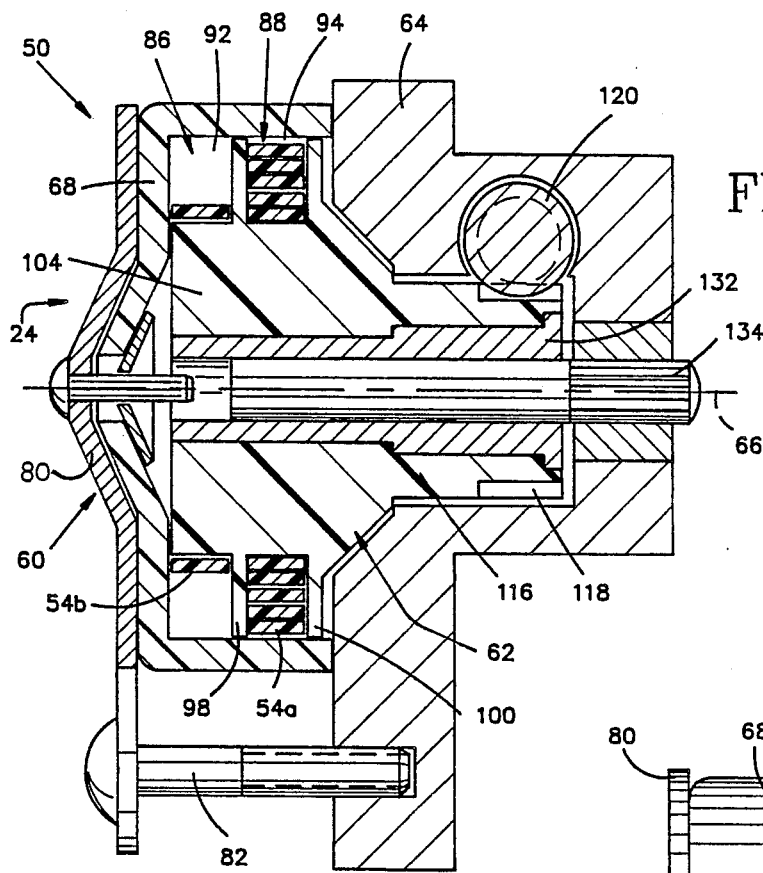
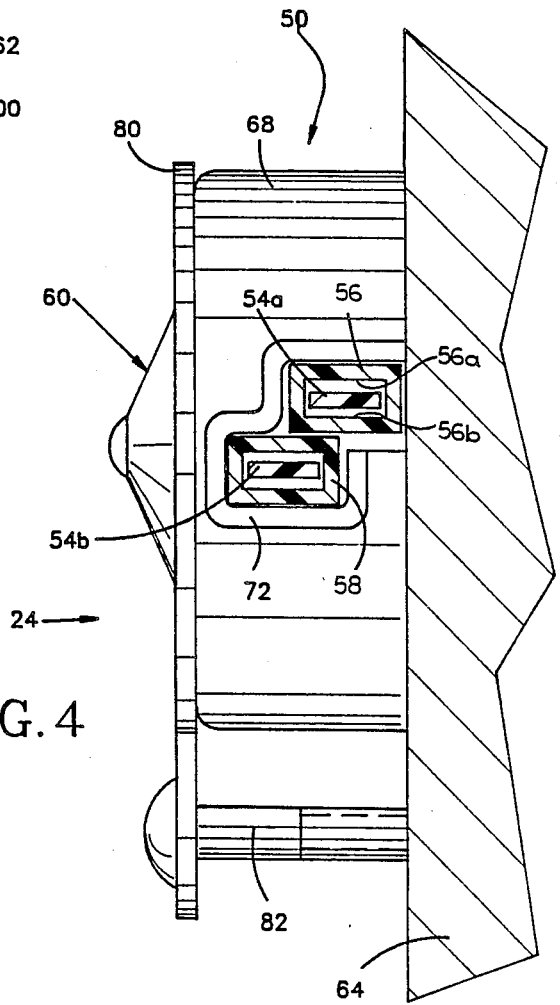

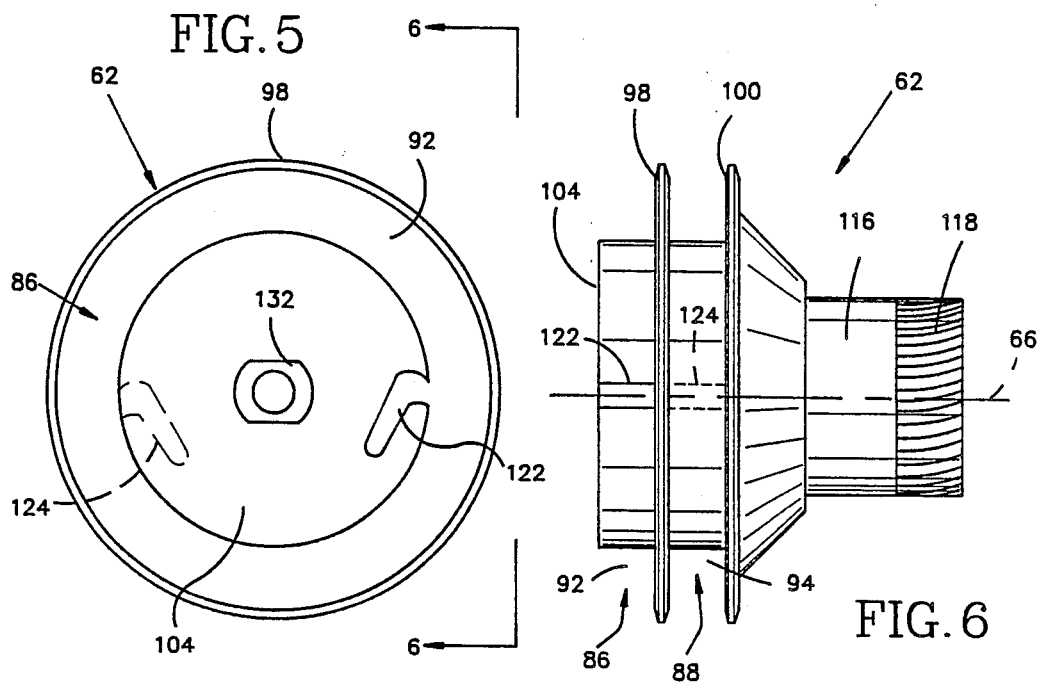
FIG. 5
FIG. 6
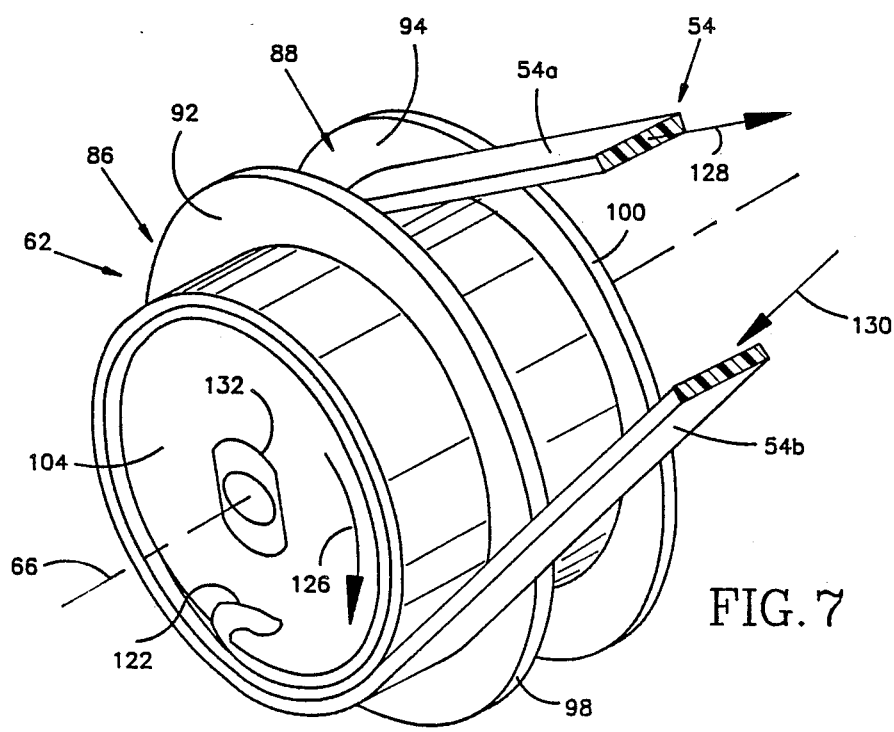
FIG. 7

PASSIVE SAFETY BELT SYSTEM

BACKGROUND OF THE INVENTION

The present invention relates to a passive safety belt system in which a safety belt is moved toward and away from an occupant of a vehicle.

A known passive safety belt system includes a track which lies above the door of a vehicle. A carrier is connected with a safety belt and moves in opposite directions along the track. When the carrier is moved in a rearward direction along the track, the safety belt is moved toward the occupant of the vehicle to position the safety belt to restrain movement of the occupant in the event of an accident. When an occupant is to exit the vehicle, the carrier is moved forwardly along the track to move the safety belt away from the occupant to facilitate exiting from the vehicle. Known passive seat belt systems of this type are disclosed in U.S. Pat. Nos. 4,061,365, issued Dec. 6, 1977, and entitled "Safety System for Protection of Automotive Seat Occupant"; 4,313,622, issued Feb. 2, 1982 and entitled "Passive Seatbelt System"; and 4,475,745, issued Oct. 9, 1984 and entitled "Seat Belt Drive Device".

Since a passive safety belt system is mounted in the passenger compartment of a vehicle, it is important that the safety belt system be compact. Even more importantly, the apparatus for moving a safety belt toward and away from the occupant of the vehicle must be durable and capable of moving a carrier back and forth along a track through many cycles of operation. Due to commercial considerations, the cost of a passive safety belt system which meets these requirements should be as low as possible.

SUMMARY OF THE INVENTION

The present invention provides a relatively compact and durable passive safety belt system which is operable to pull a safety belt toward and away from an occupant of a vehicle. During operation of the safety belt system, an elongated flexible drive element or tape pulls a carrier in opposite directions along a track. One end of the tape is connected to a first spool mechanism. The other end of the tape is connected with a second spool mechanism. A motor is operable to rotate the spool mechanisms to wind the tape on one spool mechanism and unwind the tape from the other spool mechanism.

In a preferred embodiment, the two spool mechanisms are rotatable together about a common axis by a single reversible drive motor. The two spool mechanisms are portions of a one-piece, dual channel drum or spool. When the seat belt is in one of its extreme positions, a relatively large number of turns of tape are on the spool portion from which tape is to be unwound in moving the seat belt to its other extreme position, whereas a relatively small number of turns of tape are on the spool portion upon which the tape is to be wound in moving the seat belt to its other extreme position. As the spool portions are rotated, excess tape fed from the spool portion having the relatively large number of turns is temporarily stored adjacent the spool portion and along the track until it is wound on the other spool portion.

BRIEF DESCRIPTION OF THE DRAWINGS

The foregoing and other features of the present invention will be apparent to those skilled in the art upon a reading of the following description made with reference to the accompanying drawings, wherein:

FIG. 3 is a fragmentary sectional view, taken generally along the line 3—3 of FIG. 2, illustrating the relationship between a dual channel spool and gears in the drive assembly;

FIG. 4 is a view taken generally along the line 4—4 of FIG. 2;

FIG. 5 is an end view of the dual channel spool of FIG. 3;

FIG. 6 is a side view, taken generally along the line 6—6 of FIG. 5, further illustrating the construction of the dual channel spool; and FIG. 7 is a perspective illustration depicting the manner in which the tape is simultaneously unwound from and wound on the dual channel spool of FIGS. 5 and 6.

DESCRIPTION OF ONE EMBODIMENT OF THE INVENTION

Figure 1:
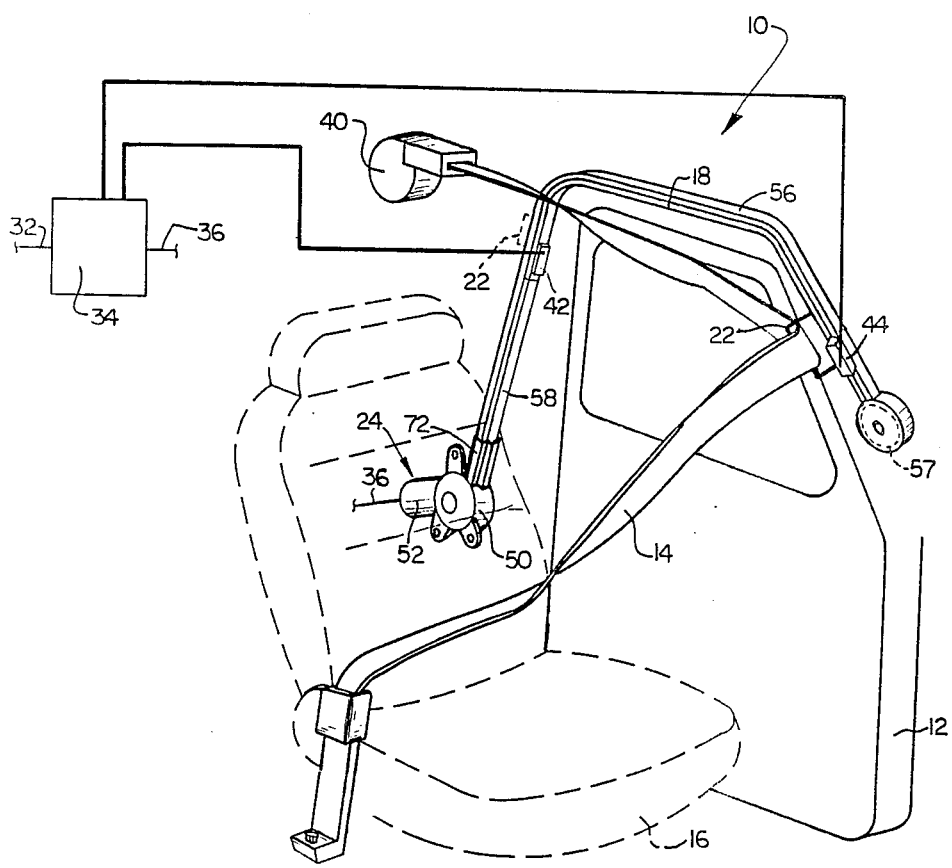
FIG. 1 is a fragmentary schematic illustration of a passive safety belt system constructed in accordance with the present invention and having a track along which a safety belt carrier is moved by a drive assembly.

A passive safety belt system 10 (FIG. 1) is mounted adjacent to the door 12 of a vehicle and is operable to move a safety belt 14 toward and away from a person in a driver's seat 16. The passive safety belt system 10 includes a track 18 which overlies the door 12 of the vehicle and is mounted on the body of the vehicle. A carrier 22 is connected with the safety belt 14 and is movable forwardly and rearwardly along the track 18. The track 18 is formed of a light weight, wear resistant metal, such as aluminum. The carrier 22 is pulled along the track 18 between a forward position, shown in solid lines in FIG. 1, and a rearward position adjacent a person in the driver's seat 16 by operation of a drive assembly 24. Because the length of the safety belt 14 required to restrain the driver in the seat 16 is less than the length required when the safety belt and carrier are in the forward position illustrated in FIG. 1, the excess length of safety belt 14 is withdrawn into a seat belt retractor 40 as the carrier 22 moves rearwardly.

When a driver gets into the vehicle, the carrier 22 is in the forward position illustrated in FIG. 1 and the safety belt 14 is located away from the seat 16 to facilitate entry of the driver. After the driver has shut the door 12 and turned a key in the ignition, a signal is transmitted over a lead 32 to a control unit 34. Upon receiving this signal, the control unit 34 energizes the drive assembly 24 with current conducted over a lead 36. Operation of the drive assembly 24 moves the carrier 22 rearwardly along the track 18 from the forward position toward the rearward position. When the carrier 22 reaches the rearward position, the carrier actuates a limit switch 42. Actuation of the limit switch 42 signals the control unit 34 that the safety belt 14 has been properly positioned relative to the driver. Upon receiving this signal, the control unit 34 terminates operation of the drive assembly 24.

When the vehicle has stopped and the ignition is turned off, a signal is conducted over the lead 32 to the control unit 34. Upon receiving this signal, the control unit 34 energizes the drive assembly 24 to move the carrier 22 along the track 18 from the rearward position to the forward position. As the carrier 22 moves forwardly along the track 18, the safety belt is pulled away from the driver of the vehicle. When the carrier 22 reaches the forward position, indicated in solid lines in FIG. 1, a limit switch 44 is actuated to signal the control unit 34 to interrupt operation of the drive assembly 24. At this time, the safety belt 14 is pulled forwardly of the driver to facilitate exiting from the vehicle.

Figure 2:
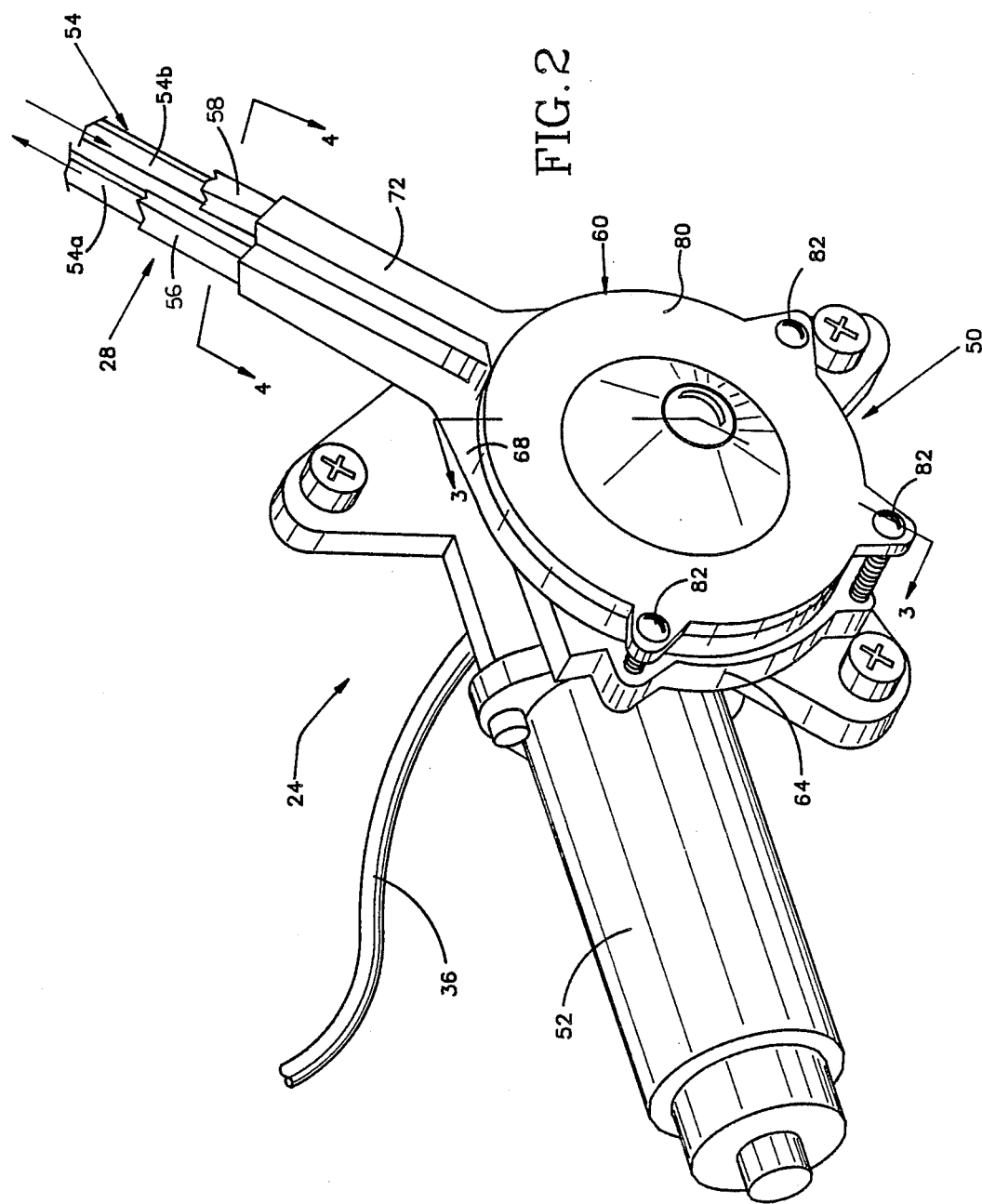
FIG. 2 is an enlarged pictorial illustration of the drive assembly of FIG. 1.

In accordance with the present invention, the drive assembly 24 (FIG. 2) is relatively compact, light weight and easily mounted in a vehicle. The drive assembly 24 includes a spool assembly 50, a reversible electric motor 52 and an elongated flexible drive element or tape 54. The flexible drive element extends from the spool assembly 50 through a first track section 56 formed of a polymeric material, around a pulley 57 at the forward end of the track 18, through the track 18, and through a second track section 58 formed of a polymeric material, to the spool assembly 50. The flexible drive element is suitably fixed to the carrier 22. The track section 56 lies adjacent the track section 58 and the carrier track 18. The spool assembly 50 is driven by the reversible electric motor 52 to pull the tape 54 around the pulley 57 and move the carrier 22 (FIG. 1) either forwardly or rearwardly along the track 18.

The tape 54 is a single piece of woven polymeric webbing material and has a width of approximately 5/16 of an inch and a thickness of approximately 1/16 of an inch. It should be understood that the foregoing dimensions of the tape 54 have merely been set forth for purposes of clarity of description and that tapes having different dimensions could be used if desired. The length of tape which is extended and retracted by the spool assembly 50 to move the carrier 22 is determined by the distance between the forward and rearward positions of the carrier 22. Elongated flexible drive elements other than a tape could be connected with the spool assembly 50 and carrier 22 if desired. However, the compact construction of the spool assembly 50 is facilitated by having the elongated flexible drive element 54 formed of a thin tape so that a relatively long length of the tape can be wound in a small space.

The spool assembly 50 includes a housing 60 (FIG. 3) which encloses a dual channel spool 62. The housing 60 includes a one-piece metal base or mounting plate 64 upon which the dual channel spool 62 is mounted for rotation about an axis 66 (FIG. 3). A one-piece cover 68 of polymeric material cooperates with the mounting plate 64 to enclose the dual channel spool 62. The one-piece cover 68 has a neck portion 72 (FIGS. 2 and 4) which is connected to the polymeric track sections 56 and 58. The neck portion 72 of the cover 68 (FIG. 4) forms channels which receive the track sections 56 and 58. A one-piece metal cover plate 80 overlies the cover 68 and is connected to the base 64 by fasteners 82. The metal cover plate 80 holds the cover 68 in place on the base 64. In addition, the cover plate 80 protects and reinforces the cover 68.

The dual channel spool or drum 62 (FIGS. 3 and 5-7) is formed as one piece and includes an axially outer spool portion 86 and a coaxial inner spool portion 88. The outer spool portion 86 includes an annular tape receiving outer channel 92. The inner spool portion 88 includes an annular tape receiving inner channel 94. The coaxial inner and outer channels 92 and 94 are separated from each other by an annular intermediate flange 98. An annular base flange 100 is disposed in a coaxial relationship with the intermediate flange 98 and cooperates with the intermediate flange to form the inner channel 94. Although the outer channel 92 is formed between the intermediate flange 98 and the cover 68, an outer flange could be provided on the dual channel spool 62 to cooperate with the intermediate flange 98 and form the channel 92. The flanges 98 and 100 project radially outwardly from and are formed as one piece with a generally cylindrical base 104.

The dual channel spool 62 is supported for rotation about the axis 66 (FIG. 3) by a metal sleeve 132. The sleeve 132 is fixed to the polymeric material of the dual channel spool 62 and is rotatable relative to a stationary axle 134. The axle 134 is fixed to the mounting plate 64 and has a central axis which is coincident with the axis 66 and which extends perpendicular to the central axis of the worm 120. Although the coaxial relationship of the spool portions 86 and 88 is preferred because it contributes to the compactness of the drive assembly 24, the spool portions could be mounted for rotation about separate axes if desired.

The dual channel spool 62 has a generally cylindrical drive section 116 which is disposed in a coaxial relationship with spool portions 86 and 88. The drive section 116 has external gear teeth 118 which engage a worm 120 (FIG. 3). The worm 120 is rotatably mounted on the mounting plate 64 and is driven by the reversible electric motor 52.

When the worm 120 is rotated by the motor 52, the dual channel spool 62 is rotated in either one of two directions about the axis 66 to wind the tape 54 onto one of the spool portions 86 or 88 and to unwind the tape from the other spool portion. Although it is preferred to form the dual channel spool 62 as one piece, the spool could be formed as a plurality of separate pieces. For example, the spool portion 86 could be separate from the spool portion 88. If this was done, a separate motor could be provided to drive each spool portion.

Retainer slots 122 and 124 (FIGS. 5 and 6) are formed in diametrically opposite sides of the dual channel spool 62. The retainer slot 122 is formed in the outer spool portion 86 and opens to the channel 92 to engage the end of the tape section 54b (FIG. 7). The retainer slot 124 is formed in the inner spool portion 88 and opens to the channel 94 to engage the end of the tape section 54a. Thus, opposite ends of the one-piece tape 54 are connected to the dual channel spool 62.

The tape 54 is wound in opposite directions on the inner and outer spool portions 86 and 88 (FIGS. 3 and 7). The tape section 54b is wound in layers which extend in a counterclockwise direction (as viewed in FIG. 7) from the retainer slot 122. The tape section 54a is wound in the opposite direction from the retainer slot 124. Therefore, when the dual channel spool 62 is rotated about its central axis 66, the tape 54 is unwound from one of the spool portions 86 or 88 and is wound onto the other spool portion.

When the motor 52 is operated in one direction, the spool assembly 50 extends an upper (as viewed in FIG. 2) section 54a of the one-piece tape 54 and retracts a lower (as viewed in FIG. 2) section 54b of the tape. This pulls the carrier 22 rearwardly along the track 18 from the forward position illustrated in solid lines in FIG. 1 to the rearward position illustrated in dashed lines in FIG. 1. Similarly, when the motor 52 is operated in the opposite direction, the spool assembly 50 extends the lower section 54b of the tape and retracts the upper section 54a of the tape. This pulls the carrier 22 forwardly along the track 18 from the rearward position to the forward position.

When the carrier 22 is in the forward position shown in solid lines in FIG. 1, the tape 54 is wound on the inner spool portion 88 (FIG. 3) and there is only a single turn of the tape around the outer spool portion 86. When the motor 52 (FIG. 2) is energized to drive the worm 120 (FIG. 3) to rotate the dual channel spool 62 in a clockwise direction, as indicated by the arrow 126 in FIG. 7, the upper section 54a of tape is unwound from the spool portion 88 in the manner indicated by the arrow 128. At the same time, the lower tape section 54b is wound onto the outer spool section 86, in the manner indicated by the arrow 130 in FIG. 7. Rotation of the dual channel spool 62 is continued until the carrier 22 has been pulled to the rearward position shown in dashed lines in FIG. 1. The tape 54 will then be almost completely unwound from the inner spool portion 88.

When the carrier 22 is to be pulled from the rearward position back to the forward position, the motor 52 is energized to drive the worm 120 and rotate the dual channel spool 62 in a counterclockwise direction, that is, in a direction opposite to the arrow 126 in FIG. 7. As this occurs, the tape section 54a is wound onto the spool portion 88. Simultaneously, the lower tape section 54b is unwound from the spool portion 86.

When a driver enters a vehicle through the door 12, the carrier 22 will be in the forward position shown in FIG. 1. At this time, the upper section 54a of the tape 54 will be wound on the spool portion 88 in the manner shown in FIG. 3. The tape will be almost completely unwound from the spool portion 86.

After the driver has closed the door 12 and actuated the ignition, the control unit 34 will energize the motor 52 to drive the worm 120. The worm 120 will rotate the dual channel spool 62 about its central axis 66 to unwind the tape 54a from the spool portion 88 and to begin winding the tape on the spool portion 86. As this happens, the carrier 22 is pulled along the track 18 by the section 54b of the tape.

Upon initiation of rotation of the dual channel spool 62, there are a relatively large number of turns of the tape 54 wrapped around the spool portion 88. Therefore, an outer layer of tape wrapped around the spool portion 88 has a substantially greater diameter and circumferential length than the layer of tape wrapped around the spool portion 86. As the worm 120 turns the dual channel spool 62 through one revolution in the direction indicated by the arrow 126 in FIG. 7, a longer length of tape will be unwound from the spool portion 88 than will be wound onto the spool portion 86. This is because the outer layer or turn of tape around the spool portion 88 has a larger diameter than the layer of tape which is wound around the spool portion 86 during the first revolution of the dual channel spool 62.

In order to eliminate the need for a spring loaded take-up pulley, there is sufficient clearance between the inner side surfaces 56a, 56b (see FIG. 4) of the track section 56 and the tape 54 to allow the tape to deflect relative to the track section 56. This enables excess tape unwound from the inner spool portion 88 to be stored along the track section 56. Also, a certain amount of excessive tape can be stored in the cover 68. Further, clearance is also provided between the track 18 and the tape 54 for this purpose. Specifically, upon initiation of unwinding of the tape 54 from the spool portion 88 of the dual channel spool 62, the portion of the tape in track section 56 will have a longitudinal central axis with a configuration which corresponds to the configuration of the longitudinal axis of the track section 56. As the dual channel spool 62 is rotated and the rate at which the tape is unwound from the spool portion 88 exceeds the rate at which tape is wound onto the spool portion 86, the section 54a of tape disposed between the spool portion 88 and the carrier 22 deflects relative to the track section 56 and track 18. As the section 54a of the tape deflects, the length of tape between the carrier 22 and spool portion 88 increases. The respective clearances between the tape 54 and track section 56 and track 18 are such to accommodate this deflection of the tape 54.

As the carrier 22 is pulled along the track 18 from the forward position toward the rearward position, the number of turns on the spool portion 88 decreases and the number of turns on the spool portion 86 increases. As this occurs, the rate of winding of the tape on the spool portion 86 increases and the rate of unwinding of the tape from the spool portion 88 decreases. When the number of turns of tape on the spool portion 86 is equal to the number of turns of tape on the spool portion 88, the rate of unwinding of tape from the spool portion 88 will be the same as the rate at which tape is wound onto the outer spool portion 86. The length of excess tape stored in the track between the spool portion 88 and the carrier 22 will then be at a maximum. Therefore, when there are equal numbers of turns of tape 54 on the spool portions 86 and 88, there is a maximum amount of deflection of the tape relative to the track section 56 and track 18.

Continued rotation of the dual channel spool 62 results in the rate of winding of tape on the spool portion 86 exceeding the rate of unwinding of tape from the spool portion 88. As this occurs, the amount of excess tape stored along the track section 56 and track 18 is diminished. When the carrier 22 reaches the rearward position shown in dashed lines in FIG. 1, all of the excess tape will have been removed and wound onto the outer spool portion 86. The configuration of the longitudinal central axis of the tape 54 will then correspond to the configuration of the longitudinal central axis of the track sections 56, 58 and track 18.

When the driver of the vehicle turns off the ignition and removes the key, the control unit 34 will cause the motor 52 to reverse the direction of rotation of the dual channel spool 62. As this occurs, the tape 54 will be unwound from the spool portion 86 and wound onto the spool portion 88. Since the diameter of the outer layer of tape 54 on the spool portion 86 is greater than the diameter of the outer layer of tape on the spool portion 88, the rate at which tape is unwound from the spool portion 86 will be greater than the rate at which tape is wound onto the spool portion 88. The excess length of tape 54 will be stored in the track section 58, track 18 between the carrier 22 and the spool portion 86, and in the cover 68. Thus, the lower section 54b of the tape will be deflected relative to the track section 58 and track 18.

When the diameter of the layers of tape wound around the spool portion 88 is equal to the diameter of the layer of tape wound around the spool portion 86, the rate at which tape is fed from the spool portion 86 to spool portion 88 will be equal. Continued rotation of the dual channel spool will result in the tape 54 being wound onto the spool portion 88 at a greater rate than it is unwound from the spool portion 86. As this is occurring, the excess tape stored along the rack section 58 and track 18 is diminished. When the carrier 22 reaches the forward position shown in solid lines in FIG. 1, the configuration of the longitudinal central axis of the tape 54 will correspond to the configuration of the longitudinal central axis of the track sections 56, 58 and track 18.

In view of the foregoing description, it is apparent that the present invention provides a relatively compact and durable passive safety belt system 10 which is operable to move a safety belt 14 toward and away from an occupant of a vehicle. During operation of the safety belt system 10, an elongated flexible drive element or tape 54 pulls the carrier 22 either rearwardly or forwardly along the track 18 to move the safety belt 14 either toward or away from the occupant of the vehicle Although the foregoing description of the passive safety belt system 10 has been in conjunction with the driver of a vehicle, it should be understood that the passive safety belt system could be used in conjunction with a passenger of the vehicle. Further, from the above description of a preferred embodiment of the present invention, those skilled in the art will perceive improvements, changes and modifications therein. Such improvements, changes and modifications are intended to be covered by the appended claims.

Having described one specific preferred embodiment of the invention, the following is claimed:

1. A passive safety belt system for a vehicle comprising:
   a safety belt for securing an occupant in the vehicle;
   a track for connection to a frame portion of the vehicle;
   a carrier member connected with said safety belt and movable along said track between first and second positions for moving said safety belt between one position in which said safety belt secures the occupant in the vehicle and another position in which said safety belt does not obstruct movement of the occupant into the vehicle or from the vehicle;
   an elongated flexible drive tape connected with said carrier member for moving said carrier member between the first and second positions and having first and second end portions;
   means located at one end of said track for moving said drive tape to cause movement of said carrier member to the first and second positions thereof;
   said track consisting essentially of parallel first and second track sections for receiving said drive tape therein and for guiding said drive tape in parallel paths, one of said first and second tack sections overlying the other of said first and second track sections;
   a pulley located at the other end of said track adjacent the ends of said first and second track sections and having a horizontal axis around which said drive tape extends to guide movement of said drive tape between said overlying first and second sections;
   said moving means comprising:
      a housing having a guide portion, said guide portion of said housing having first and second chambers receiving said first and second track sections, respectively,
      first spool means located in said housing, connected with the first end portion of said drive tape and rotatable for winding said first end portion of said drive tape on said first spool means to guide said drive tape around said pulley from the first track section into the second track section to move said carrier member to the first position thereof,
      second spool means located in said housing, connected with the second end portion of said drive tape, and rotatable for winding said second end portion of said drive tape on said second spool means to guide said drive tape around said pulley from the second track section into the first track section to move said carrier member to the second position thereof, and
      drive means for driving said first and second spool means to wind said drive tape on said first spool means and to unwind said drive tape from said second spool means and for driving said first and second spool means to wind said drive tape on said second spool means and to unwind said drive tape from said first spool means.

2. A passive safety belt system as set forth in claim 1 wherein said first and second spool means are supported for rotation about a common axis.

3. A passive safety belt system as set forth in claim 1 wherein said first and second spool means are rotated in one direction by said drive means to wind said drive tape on said first spool means and to unwind said drive tape from said second spool means and are rotated in a direction opposite to said one direction by said drive means to wind said drive tape on said second spool means and to unwind said drive tape from said first spool means.

4. A passive safety belt system as set forth in claim 3 wherein said first and second spool means are fixedly interconnected and are rotatable about a common axis by said drive means.

5. A passive safety belt system as set forth in claim 1 wherein said drive means includes a single motor which is operable to rotate said first spool means to wind the drive tape thereon and is operable to rotate said second spool means to wind the drive tape thereon.

6. A passive safety belt system as set forth in claim 5 further including gear means for connecting said motor with said first and second spool means, said motor being operable in one direction to drive said gear means to rotate said first and second spool means to wind said drive tape on said first spool means and to unwind said drive tape from said second spool means, said motor being operable in a direction opposite from said one direction to drive said gear means to rotate said first and second spool means to wind said drive tape on said second spool means and to unwind said drive tape from said first spool means.

7. A passive safety belt system as set forth in claim 1 wherein said drive tape is wound onto said first spool means at a first rate and is unwound from said second spool means at a second rate which is greater than the first rate so that the length of said drive tape disposed along a respective track section increases, said drive tape being deflectable from a configuration in which a portion of said drive tape extending along said track section has a longitudinal axis with a configuration which corresponds to the configuration of the longitudinal axis of the respective track section to a configuration in which the portion of said drive tape extending along the track section has a longitudinal axis with a configuration which differs from the configuration of the longitudinal axis of the respective track section when the rate of unwinding of said drive tape from said second spool portion exceeds the rate of winding of said drive tape onto said first spool portion.

8. A passive safety belt system as set forth in claim 1 wherein said first and second spool means are fixedly interconnected and are rotatable about a common axis by said drive means, said drive tape being wrapped around said first spool means in one direction and being wrapped around said second spool means in another direction opposite from said one direction.

9. A passive safety belt system as defined in claim 1 wherein said first spool means and said second spool means are connected and form a common drum, said drum having a radially extending annular flange separating said first spool means and said second spool means, said first end of said drive tape being wound in one direction around said first spool means and said second end of said drive tape being wound in the opposite direction around said second spool means.

10. A passive safety belt system as defined in claim 9 wherein said drive means for driving said first and second spool means comprises a reversible electric motor drivingly connected to said first and second spool means.

11. A passive safety belt system as defined in claim 10 further including a spool cover for enclosing said first and second spool means.

12. A passive safety belt system for a motor vehicle, said system comprising:
a safety belt for securing an occupant in the vehicle;
an elongated flexible drive tape connected with said safety belt and having opposite ends; and
a spool having a first spool portion connected with a first one of said opposite ends of said drive tape to cause said drive element to wind thereon when said spool is rotated in one direction and unwind therefrom when said spool is rotated in a second direction, a second spool portion axially spaced from said first spool portion, coaxial therewith, and connected with a second one of said opposite ends of said drive element to cause said drive element to unwind from said second spool portion when said spool is rotated in said one direction, and to wind onto said second spool portion when said spool is rotated in said second direction, said safety belt being movable away from the vehicle occupant when said spool is rotated in said one direction, and toward the vehicle occupant when said spool is rotated in said second direction, and a third spool portion axially spaced from said first and second spool portions and coaxial therewith;
a reversible electric motor for rotating said spool in said one and second directions, said reversible electric motor having an output shaft; and
means for drivingly connecting said reversible electric motor and said spool, said drivingly connecting means comprising gear teeth formed on said third spool portion and a gear mounted on said output shaft of said reversible electric motor and engaging said gear teeth for rotating said spool in said one direction and said second direction upon actuation of said reversible electric motor.

13. A passive safety belt system as set forth in claim 12 further comprising a housing for receiving said spool, said housing comprising a one-piece plate for supporting said spool for rotation and a cover connected to said one-piece plate.

14. A passive safety belt system as set forth in claim 13 comprising first and second tracks associated with said first and second spool portions, respectively, and through which respective portions of said flexible drive tape extend, said cover having a neck portion for receiving said first and second tracks.

15. A passive safety belt system as set forth in claim 14 wherein said cover is a one-piece plastic molding.

16. A passive safety belt system as set forth in claim 12 wherein said flexible drive tape is a flat tape having first and second end portions defining, respectively, said first and second ends and wound about said first and second spool portions, respectively.

17. A passive safety belt system as set forth in claim 16 wherein the widths of said first and second spool portions are substantially the same and are substantially equal to the width of said flat tape.

18. A passive safety belt system for a motor vehicle, said system comprising:
a safety belt for securing an occupant in the vehicle;
a track for connection to a frame portion of the vehicle;
a carrier member connected with said safety belt and movable along said track between first and second positions for moving said safety belt between one position in which said safety belt secures the occupant in the vehicle and another position in which said safety belt does not obstruct movement of the occupant of the vehicle into the vehicle or from the vehicle;
an elongated flexible flat drive tape connected with said carrier member for moving said carrier member between the first and second positions and having first and second end portions;
first spool means connected with the first end portion of said flat drive tape and rotatable for winding said first end portion on said first spool means to move said carrier member to the first position thereof;
second spool means connected with the second end portion of said flat drive tape and rotatable for winding said second end portion of said flat drive tape on said second spool means to move said carrier member to the second position thereof; and
drive means for rotating said first and second spool means in a first direction to wind said flat drive tape on said first spool means and to unwind said flat drive tape from said second spool means and for rotating said first and second spool means in a second direction opposite to said first direction to wind said flat drive tape on said second spool means and to unwind said flat drive tape from said first spool means;
the width of said first and second spool means being substantially equal to the width of said flat drive tape, and said first and second end portions of said flat drive tape when wound on said first and second spool means, respectively, forming a plurality of superimposed turns thereon, the total length of superimposed turns wound on said first and second spool means, respectively, in moving said carrier member between said first and second positions, respectively, being equal to the distance between the first and second positions of said carrier member on said track.

* * * * *